(No Model.) 2 Sheets—Sheet 1.
H. H. McCORD.
CORN PLANTER.
No. 343,250. Patented June 8, 1886.
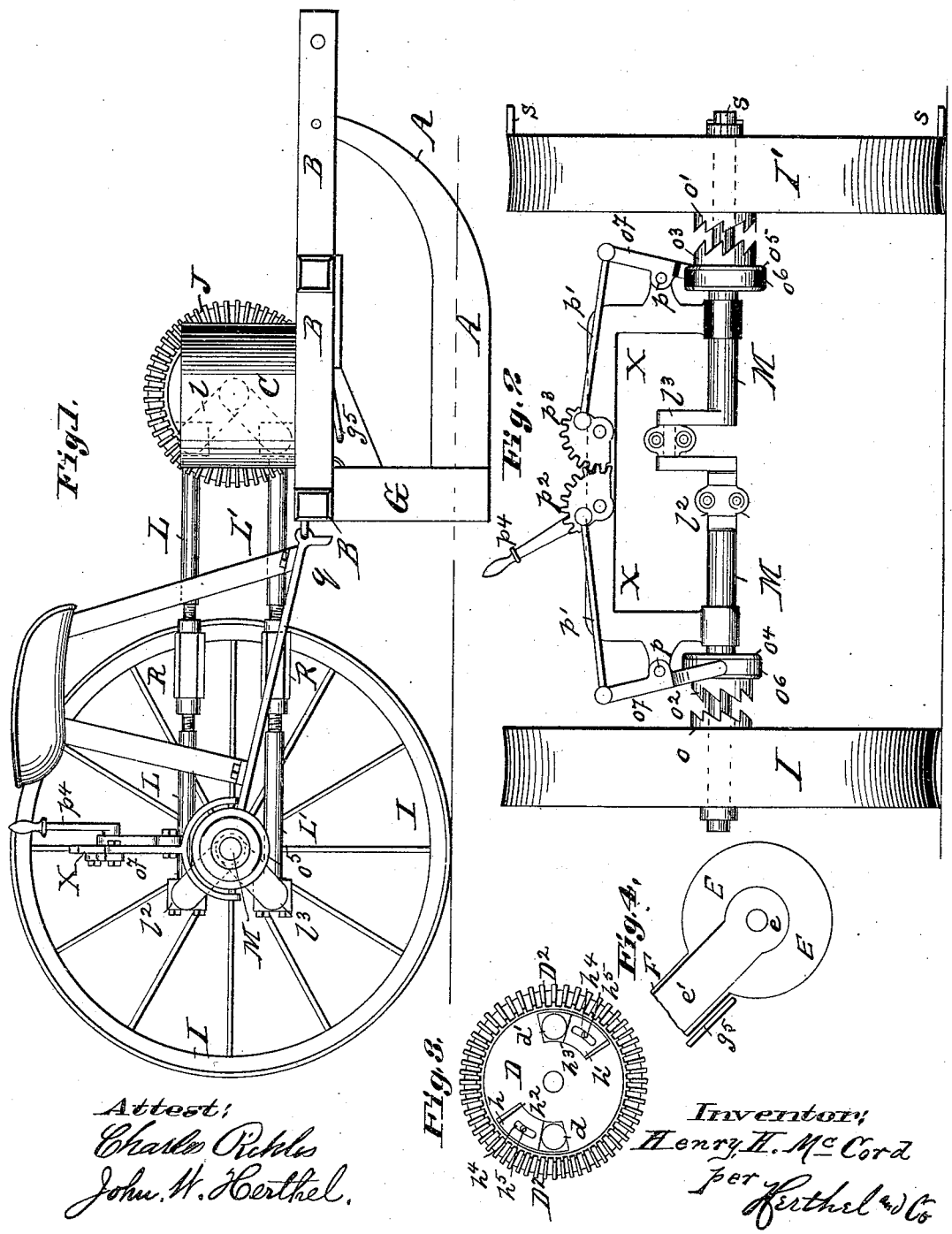
Attest:
Charles Pickles
John W. Herthel.
Inventor:
Henry H. McCord
per Herthel & Co (No Model.) 2 Sheets—Sheet 2.
H. H. McCORD.
CORN PLANTER.
No. 343,250. Patented June 8, 1886.
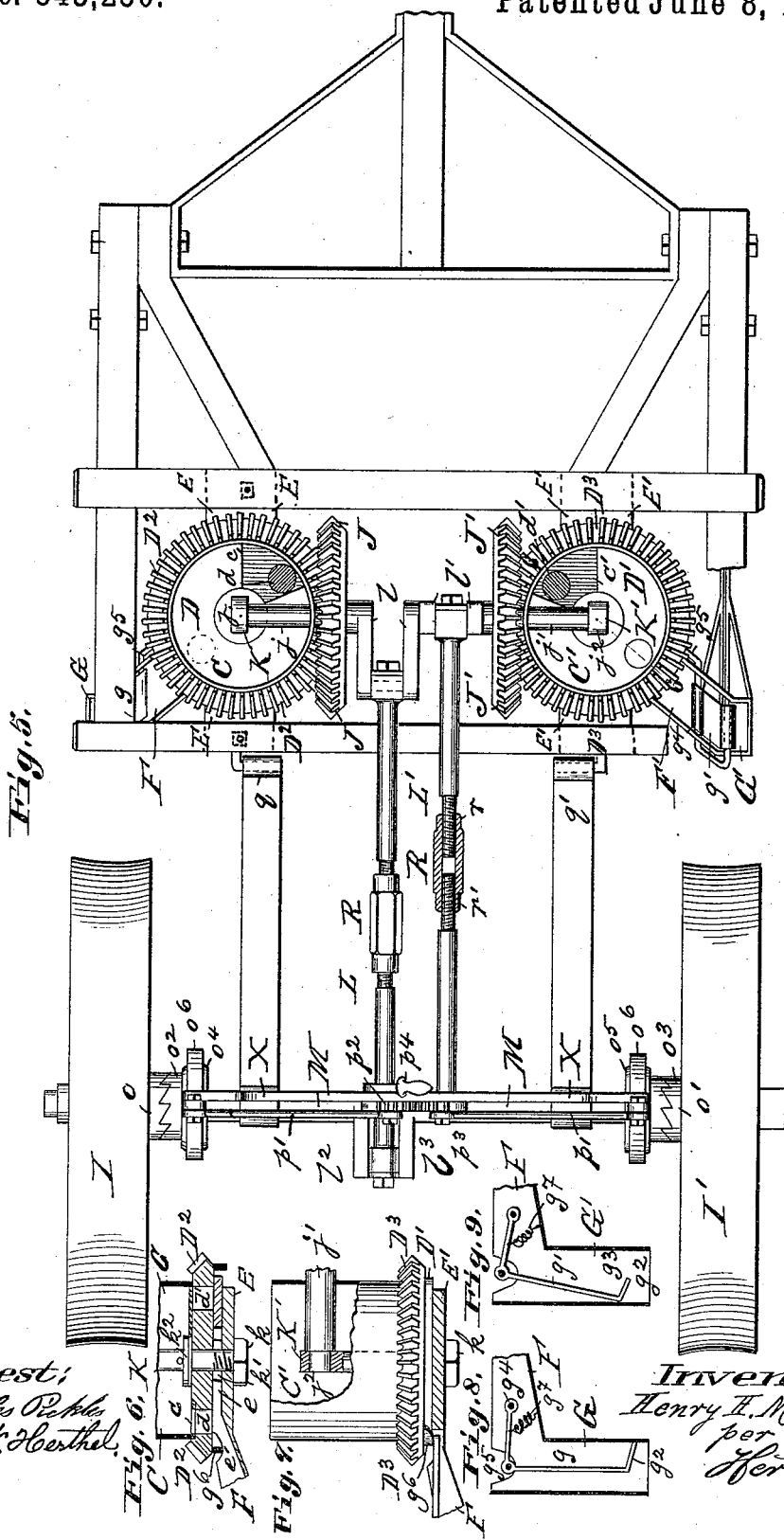
Attest:
Charles Pickle
John W. Herthel
Inventor:
Henry H. McCord
per
Herthel & Co.

UNITED STATES PATENT OFFICE.

HENRY H. McCORD, OF ST. LOUIS, MISSOURI.

CORN-PLANTER.

SPECIFICATION forming part of Letters Patent No. 343,250, dated June 8, 1886.

Application filed May 4, 1885. Serial No. 164,394. (No model.)

*To all whom it may concern:*

Be it known that I, HENRY H. McCORD, a citizen of the United States, residing at St. Louis, and State of Missouri, have invented a new and useful Improved Corn-Planter, of which the following is a specification.

The object of my invention is to utilize the driving action of the wheels of the planter to operate the seed-dropping mechanism and effect an automatic dropping of the seed at uniform distances apart and coincident with the marking of the hill, at the same time mark the position of the hills and lay off the rows, so that the planting can be done in check-row; also, to provide for the desired uniform dropping of the corn, with means to regulate or control the number of the seed to be planted to suit the varying nature of the soil; also, to be able to throw the driving-wheels in and out of gear with its connection to the seed-dropping mechanism, to reverse the planter at the end of the furrow or field; and otherwise my invention relates to certain detail construction and operation of parts, all of which will now more fully appear. I accomplish these objects by the mechanism illustrated in the accompanying drawings, of which—

Sheet I, Figure 1 is a side elevation. Fig. 2 is a rear elevation with the driving-wheels thrown out of gear with the seed mechanism. Fig. 3 is a plan view of one of the rotary seed-valves as consisting of a disk with bevel-gear and having one or more openings controlled by adjustable slides. Fig. 4 is a plan view of the bottom plate having countersunk chamber leading to the inclined discharge-chute. Sheet II, Fig. 5 is a top plan of the entire corn-planter complete. Fig. 6 is a detail cross-section of the bottom parts—such as the seed-box, its rotary seed-valve, and the bottom chamber-plate—with the parts shown to attach the said seed-valve so as to be capable of rotation top of the bottom plate. Fig. 7 is a side elevation of the same parts shown in Fig. 6, with the addition of showing in section the connection of the vertical and transverse shaft inside of the seed-box. Figs. 8 and 9 show the gate in its open and closed condition within the discharge-chute.

Similar letters of reference refer to similar parts throughout the several views.

A represents the runners, having their respective ends secured to the frame-work B, upon which the operating parts are mounted, as shown.

C C' are the seed-boxes, in which the corn is contained preparatory to planting same. The bottom of each seed-box has openings $c\,c'$, which permit the seed to drop through. (See Figs. 5 and 6.) These openings are kept open or shut by the respective rotary seed-valves D D', of which there is one under the bottom of each box. (See Figs. 3, 5, 6, and 7.) Forming part of the seed-valves are bevel-gears $D^2\,D^3$, the disk-faces of which virtually constitute the rotary seed-valves aforesaid, and as shown more clearly in Fig. 3. Each seed-valve has also one or more openings, $d\,d'$. (See Figs. 3, 5, and 6.) When the openings in the seed-valve come in line with the openings in the seed-box, the seed is permitted to drop through; but when the openings are not in line it is the disk-face of the seed-valve that closes the opening in the bottom of the seed-box and prevents the seed from being dropped or planted.

E E' represent the two bottom plates secured stationary to the under side of the frame-work B. (See Fig. 5.) It is these bottom plates that form a bearing for the seat-valves to revolve upon. (See Figs. 4, 6, and 7.) The center of these bearing-plates is countersunk, forming a chamber, $e$, with the farther channel communication $e'$ to the inclined chutes F F'. (See Figs. 4, 5, 6, and 7.) The inclined chutes F F' communicate with the top of the farther vertical discharge-chutes G G', as indicated in Figs. 1, 5, 8, 9. Therefore, the grain dropped below each rotary seed-valve falls into the top, respectively, of the incline chutes F F', down same into the vertical chutes G G', that are arranged immediately behind the runners. The grain so dropped is controlled or regulated in its discharge from the vertical chutes G G' (and before the final deposit of the seed into the ground) by the action of the hinged valves or gates $g\,g'$. (Shown more clearly in Figs. 8 and 9.) In said figures I show these gates in their open conditions. These gates can consist simply of a vertical plate fitted to vibrate inside its discharge-chute. More specifically stated, the lower end of the gate at $g^2$ is bent so that when it comes against the side of the chute it prevents the corn dropping below; but when the gate is vibrated to the other side of the chute the bent portion $g^2$ of the gate leaves sufficient clearance at $g^3$ for the seed to drop below it. (See Figs. 8 and 9.)

To operate the gates to open or close, each is hinged at $g^4$, and at $g^5$ have a stem projecting in line of action with a lug, $g^6$, which is shown as belonging to the under side of the rotary seed-valves. (See Figs. 1, 5, and 7.) When this lug of the rotary seed-valve strikes against the stem $g^5$, it is depressed, raising the gate sufficiently to cause its bent portion $g^2$ to open the clearance $g^3$. When the engagement of said lug with the stem is released, the gate, by means of the spring $g^7$, is restored to its original position.

Each seed-valve D D', I provide with the adjustable slides $h\ h'$, for purposes of enlarging or decreasing the size of the openings in each of said seed-valves and to suit the number of grains of corn to be planted at one time; hence, each of the slides $h\ h'$ are seated in a corresponding recessed seat, $h^2\ h^3$, made in the face of the seed-valve. Further, each has a slot, $h^4$, and set-screw $h^5$, by means whereof they can be adjustably secured. (See Fig. 3.)

To drop a greater or less number of grains, the operator simply sets the slides to suit the size of the opening wanted; this done, screws down the set-screw to retain the slides securely in adjusted position.

To impart a rotary motion to each seed-valve D D' by the revolving action of the driving-wheels I I' of the planter and achieve an automatic dropping of the seed, I have provided the following parts:

J J' are bevel-gears, one for each seed-valve, and fitted to mesh with the bevel-gear of said valve. (See Figs. 1 and 5.) These side gears carry each a transverse shaft, $j\ j'$, which have their inner ends journaled to turn at $j^2$, top of the farther upright shafts K K'. (See Figs. 5, 6, and 7.) These shafts K K' are arranged to pass up centrally through the bottom plates, seed-valves, and bottom of the seed-boxes, and extend to near the top of the latter, as shown. Further, said shafts are secured stationary, and for this purpose their lower threaded ends are secured by a bottom nut, $k$, intermediate nut at $k'$, and top nut at $k^2$, as indicated in Figs. 6 and 7. Therefore the rotary motion of the meshing bevel-gears rotates the seed-valves, the upright shafts K K' simply forming a support for the inner ends of the shafts of the side bevel-gears to revolve upon. (See Figs. 5 and 7.)

L L' are two pitmen to connect with the double cranks $l\ l'$ at the front and similar cranks, $l^2\ l^3$, at the rear. (See Figs. 1, 2, and 5.) The front cranks connect with and turn the side bevel-gears, J J', respectively, and the rear cranks connect and turn with the axle M of the driving-wheels I I', as shown. By this arrangement the one pitman descends and the other ascends in revolving the side bevel-gears, and the rotation of the latter, together with that of the seed-valves, is accomplished simultaneously with the revolving of the axle M and driving-wheels.

As shown in Fig. 5, the axle-shaft M has the driving-wheels secured to turn with said axle. I have, however, provided the following devices by means whereof the driving-wheels can be thrown in and out of gear—that is to say, to revolve independently of the axle, being made to turn as when the seed mechanism is not to be used, or to cause the said axle to revolve with the driving-wheels to produce an automatic rotary motion of the seed-valves. Therefore each driving-wheel can run loosely on the axle-shaft M. Further, I provide each driving-wheel with the clutch-boxes $o\ o'$. Similar clutch-boxes, $o^2\ o^3$, slide on the axle M. (See Figs. 1, 2, 5.) Forming part of the clutch-boxes on the axle-shaft are the collars $o^4\ o^5$. These have their periphery grooved and fitted to receive the ring $o^6$, to which the yoke-lever $o^1$ is attached. (See Figs. 1, 2, and 5.) The ring permits the clutch-boxes to turn with the axle, and when the yoke-lever is shifted from side to side the ring acts as means to slide the clutch-box, as indicated.

To shift the yoke-levers they are connected by a pivotal arm, $p$, to the upright frame X; also, the upper end of the yoke-levers, by rod $p'$, connects to the sector-wheels $p^2\ p^3$, these being pivoted also to the frame X, and so as to be simultaneously operated by the hand-lever $p^4$, as shown in Figs. 1, 2, and 5.

As apparent, the driving-wheels are thrown into gear when the seed mechanism is to be operated, the axle-shaft then being turned by the action of the driving-wheels, and this rotary motion is imparted to both seed-valves, to control the dropping of the seed.

It will be noted I utilize the direct action of the wheels of the planter to automatically operate the seed-dropping mechanism, including the gates that finally control the deposit of the corn into the ground.

The driving-wheels can be lifted from the ground by any suitable hand-lever attachment, since the hinge-joints at $q\ q'$ (see Figs. 1 and 5) permit the said wheels and rear portion of the planter to be raised or lowered.

In Figs. 1 and 5 I show the two pitmen as made in sections and coupled together. R represents this coupling. It is simply a sleeve having right and left threads at $r\ r'$. Similary the ends of the pitmen-halves have right and left threads to match those of the sleeve-coupling. (See Fig. 5.) Thus coupled the pitmen can be suited as to lengths, and a proper connection with the remaining parts of the planter.

In Fig. 2 I show one of the driving-wheels provided with projecting lugs $s$, arranged equidistant along the periphery and at quarter-points. It is these lugs that mark the hills and indicate the place where the seed has been planted.

My improved corn-planter possesses the advantages of being a check-row planter, marker, and automatic seed-dropper all in one.

What I claim is—

1. The improved corn-planter, consisting, essentially, of the following elements: the seed-boxes C C', having openings, the seed-valves D D', having similar openings, the meshing bevel-gears $D^2$ $D^3$ J J', the latter connected by double cranks to pitmen L L' at the front thereof, the rear end of said pitmen connecting similarly by cranks to the crank-axle shaft M, turning with the driving-wheels, the inclined and discharge chutes communicating with the openings in the seed-boxes and seed-valves, the latter carrying lugs $g^6$, and the discharge-chute having a hinged gate, all said parts operating simultaneously, as and for the purposes set forth.

2. In a corn-planter, the combination of the seed-boxes C C', provided with respective openings $c$ $c'$, the rotating seed-valves D D', having the respective openings $d$ $d'$, mechanism, substantially as described, whereby the said seed-valves are rotated by the motion of the wheels I I', the lugs $g^6$, situated at proper points on the seed-valves, the incline chutes F, the vertical chutes G, and the valves or gates $g$, pivoted at $g^4$, carrying the rods $g^5$, operated by the corresponding lugs, $g^6$, and controlled by the springs $g^7$, substantially as specified.

3. In a corn-planter, the combination, with the seed-boxes, rotating seed-valves, meshing beveled gearing, crank-shafts $j$ $j'$, having the cranks $l$ $l'$, pitmen L L', and crank-shaft M, having the cranks $l^2$ $l^3$, of the wheels I I', clutches $o$ $o^2$ and $o'$ $o^3$, the rings $o^6$, moving in the grooves of the enlargements $o^4$ $o^5$, the frame X, bifurcated levers $o^7$, pivoted thereon, the connecting-rods $p'$, the meshing segmental racks pivoted in the frame X, and the actuating-handle $p^4$, all constructed and arranged substantially as and for the purpose set forth.

In testimony of said invention I have hereunto set my hand.

HENRY H. McCORD.

Witnesses:
WILLIAM W. HERTHEL,
JOHN W. HERTHEL.